INVENTORS
GEORGE G. MORIN AND
BY EMILE J. CARLETON
Chapin & Neal
ATTORNEYS

Patented Feb. 4, 1941

2,230,361

UNITED STATES PATENT OFFICE 2,230,361

POWER DRIVEN STEERING MECHANISM

George G. Morin and Emile J. Carleton, Holyoke, Mass.

Original application April 15, 1938, Serial No. 202,262. Divided and this application September 26, 1939, Serial No. 296,606

2 Claims. (Cl. 180—79.2)

This invention relates to power steering mechanisms for motor vehicles such as automobiles, aeroplanes, or water craft.

More particularly the invention has in view the application to devices of this character of a hydraulic control means in the form of a self-contained servo-motor controllable by manual operation and operable by hydraulic pressure so controlled to move the steering gear of the vehicle. The hydraulic control means preferably employed is that disclosed and generically claimed in my copending application Serial No. 202,262, filed April 15, 1938, of which the present application is a division.

One object of the present invention is to provide an arrangement in which the power means presents no interference with the manual operation of the steering gear in the event that the hydraulic pressure fails. A further object is to provide in a device of this character a manner of coupling the power means to the steering gear so that the "feel" of the road will be retained while affording complete power operation and holding the steering wheel by power against excessive road reactions.

Other and further objects will appear from the following description and claims.

Referring to the drawings.

Figure 2:
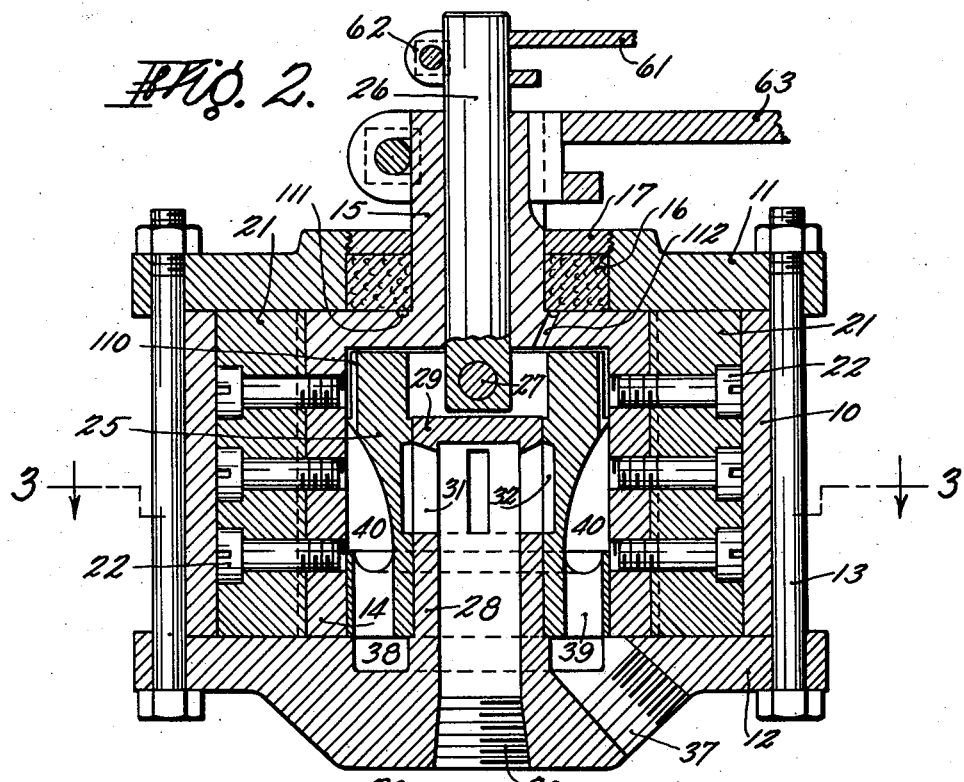
Fig. 2 is a median section through the servo-motor.
Figure 3:
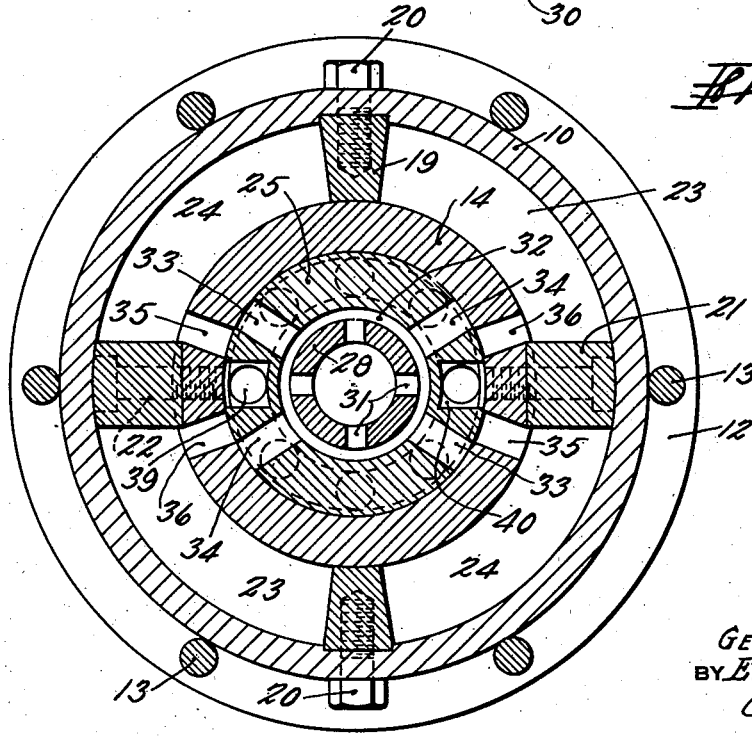
Fig. 3 is a section on line 3—3 of Fig. 2.

Referring first to Figs. 2 and 3, the control device is enclosed within a housing comprising a cylindrical shell 10 and end headers 11 and 12 secured against the end of the shell by tie bolts 13. Fitting snugly between the end headers and spaced radially from the inside of the shell 10 is a cylinder 14 having a shank 15 extending out through a central aperture in the header 11. In order to form a fluid-tight joint a packing 16 is placed around the shank 15 and is held in place by a collar 17 threaded into the header 11. The annular space between the shell 10 and the cylinder 14 is bridged by blocks 19 held by screws 20 to the shell and by blocks 21 held by screws 22 to the cylinder. There are thus formed two opposed pairs of arcuate spaces 23 and 24. Fitting snugly within the cylinder is a control member 25 having a handle 26 secured to it as by a pin 27 and extending outwardly through the shank 15 of the cylinder.

The port structure of the device will now be described. The header 12 has a hollow inward extension 28 closed at its inner end 29 and having its outer end 30 threaded for reception of a pipe connection from a suitable source of pressure. Near its inner end the extension 28 is provided with one or more ports 31 communicating with an annular chamber 32 formed within the control member. The latter chamber communicates with opposed ports 33 and 34 which in certain positions of rotation of the control member will become aligned with ports 35 and 36 formed in the cylinder 14 on opposite sides of the blocks 21. The header 12 also has a threaded connection 37 for connection with a pipe leading to a sump or the inlet of the source of fluid pressure, and opening into an annular chamber 38. Holes 39 in the control member 25 open at one end into this annular chamber and at the other end into ports 40 which in the position shown in Fig. 2 underlie the blocks 21 but which in other positions of rotation of the control members may connect with either the ports 35 or 36.

Before considering the application of the device to the power operation of the steering gear of a vehicle, the operation of the parts thus far described will be described briefly. Assuming the fluid pressure to be supplied as indicated and the control member to be rotated a slight amount in a clockwise direction as viewed in Fig. 3, the fluid will pass through ports 31 into the annular chamber 32 and thence through ports 34 and 36 into the arcuate chambers 23. At the same time the arcuate chambers 24 will be connected by the ports 35 and 40 with the outlet pipe 37. The blocks 19 cannot move, as they are fastened to the stationary shell 10; but the blocks 21 are formed with a running fit inside the shell and will be moved clockwise, carrying the cylinder 14 with them. This motion will continue until the ports again assume the relative positions shown in Fig. 3 (although in a different angular position relative to the shell 10 and the blocks 19) and will then cease. The cylinder can be moved in either direction again by shifting the control member to a corresponding position. The result is that the control member can be moved manually, with no substantial resistance, to any desired position, and the cylinder 14 will follow it with the full force of the fluid pressure. As thus far described, the device operates to shift the cylinder by power into any predetermined position, the degree and direction of this motion being wholly under the manual control of the operator through the control member.

The relative positions of the ports 33, 35, and 34, 36, is a matter of some importance, and should be regulated in accordance with the use to which the device is to be put. In the neutral position of Fig. 3 the ports 33, 34 should have passed completely beyond their respective ports 35, 36, so that communication between them is cut off; and the outlet port should either be in communication with the ports 35, 36 or just on the verge of such communication to avoid excessive lost motion in the control. Having all ports closed in the neutral position with substantial overlap will, however, have definite advantages for some uses. If an incompressible fluid such as oil is used the complete closing of all ports in the neutral position will lock the members 10 and 14 together until the control member is rotated, a matter of some importance in such uses as the stering of automotive vehicles where there is a substantial reaction due to road shocks. In this case, also, the use of a substantial overlap in the ports 33, 35 and 35, 36 has the advantage that if there is shimmying of the wheels the mechanism will not be shifted sufficiently to permit the fluid to pass rapidly and alternately through the ports, a condition which might result in considerable foaming where oil is used as the liquid.

The ports 31 are located entirely within the casing, and no leakage can occur from them to the outside. Every place where leakage can occur is directly or indirectly vented to the exhaust chamber 38, so that no oil is lost but is maintained within the recirculating system. The surface of the member 25 is preferably somewhat relieved, as at 110, to permit any leakage between the members 29 and 25 to vent back to the exhaust line. An annular recess 111 may be provided in the member 14, vented as at 112 to the space between the members 14 and 25, so as to vent off any oil flowing past the end of member 14 near the extension 15. Any flow past the other end will of course find its way directly to the exhaust channel 38.

Figure 1:
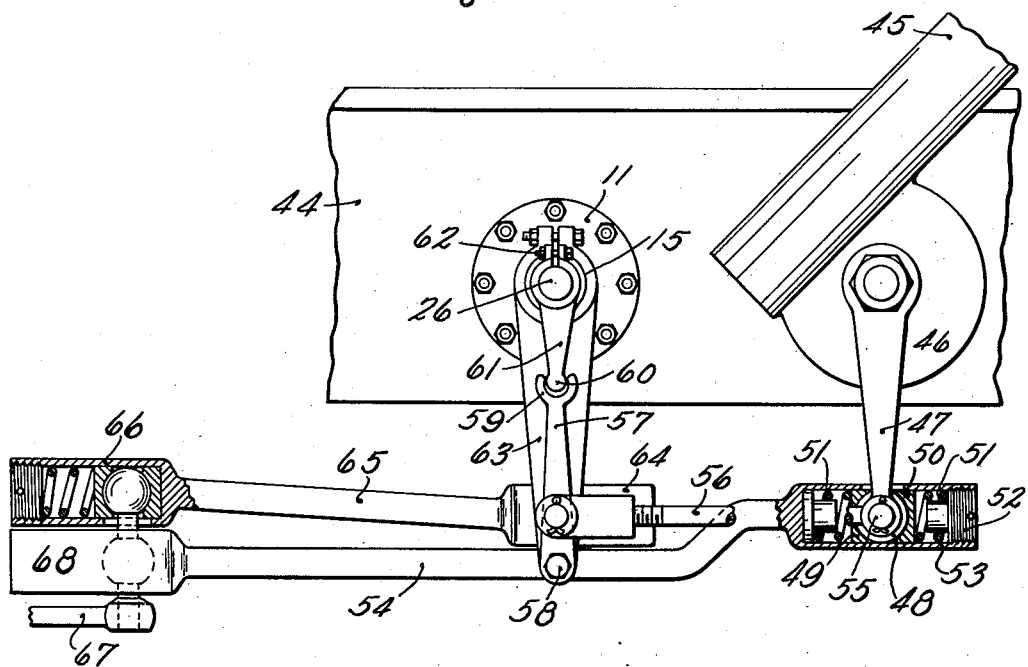
Fig. 1 is a side elevational view partly in section of the essential parts of a steering gear for automobiles embodying the invention.

The application of the device to steering mechanism will now be described in connection with Fig. 1. The housing of the control member is connected in any suitable manner to the side frame 44 of the motor vehicle, the header 11, the control rod 26, and the shank 15 of the cylinder 14 being visible in the drawings. Also attached to the frame 44 is the steering post 45 having any suitable mechanism enclosed within the case 46 from which the steering arm 47 extends. This steering arm has the usual ball 48 on its end, located between blocks 49, 50 held by springs 51 secured by a plug 52 in a housing 53 as is customary. The springs 51, however, are made somewhat lighter than would be the case in a purely manually operable gear, so that they tend to compress a small amount before the steering arm imparts motion to the drag link 54 in the end of which the housing 53 is formed. Also secured to the ball 48, or to an adjacent point on the steering arm, is a pin 55 connecting the arm to a link 56 pinned at the other end to a lever 57 pivoted at 58 to an arm 63 later to be described. The upper end of the lever 57 is forked at 59 to receive the ball end 60 of an arm 61 clamped to the control rod 26 as shown at 62 in Figs. 1 and 2. The arm 63 is clamped to the shank 15 of cylinder 14, and is joined by a ball and socket coupling 64 of the usual type to a link 65. The latter link is coupled by a ball and socket connection 66 to the knuckle arm 67 of the front wheel. The drag link 54 is also coupled to the knuckle arm by a similar ball and socket connection 68.

This form of apparatus functions as follows: If the steering arm 47 is manually displaced through the operation of the steering gear in the usual manner, one of the springs 51 will be compressed, since it is not strong enough to cause motion of the front wheels through the drag link 54, and the rod 56 will be moved since it is joined to the steering arm directly and not through the springs. This causes a motion of the link 56 before the drag link 54 is moved, since the first is coupled directly to the steering arm and the second is coupled to it through the springs 51. The result of this is that the arm 57 is rotated by the link 56 about the then stationary pivot 58, causing rotation of the arm 61 and consequently of the control member 25. In the manner previously described this movement of the control member admits fluid pressure to the chambers 23 or 24 (depending upon which way it was moved) and thus causes the cylinder 14 to rotate a corresponding amount. As the cylinder rotates, the arm 63 is moved, exerting a direct power action on the knuckle arm through the link 65. The same movement of the arm 63 shifts the pivot 58, bringing the arms 57 and 61 once more into alignment, although in a new angular position. The knuckle arm 67 will be held positively in this position by fluid pressure acting through arm 63, no strain being exerted back through the steering arm 47. Should the fluid pressure source fail, however, the steering arm 47 will serve to actuate the drag link 54 manually in the usual way, except that some back lash will be present due to the necessity of compressing the springs 51 before positive movement can take place. The steering mechanism is thus under complete manual control whether or not the fluid pressure is operative.

Certain prior types of power steering devices have been subject to the difficulty that the operator could sense no "feel of the road" in the steering wheel. The present device is not subject to the same objection. When the wheel is first turned it meets a resistance due to the necessity of compressing the springs 51 which are held by the drag link 54. The amount of this resistance can be varied by changing the amount of lap between the ports, a greater lap requiring the arm 61 to be turned further, and therefore the springs 51 to be compressed more, than with a lesser lap.

While the invention has been above described with particular reference to the steering gear of an automobile, it will be understood that it is equally applicable to the steering gear of aeroplanes as well as to the steering gear of other vehicles.

We claim:

1. A steering mechanism for motor vehicles and the like comprising a mechanical steering mechanism including a steering arm, a drag link connecting said arm to the steering knuckle arm, said drag link having a lost-motion connection to said steering arm, a servo-motor provided with a power arm, a link connecting the steering knuckle arm to said power arm at a point inwardly of the free end of the latter, a lever controlling the servo-motor pivoted to the free end of said power arm, and a link connecting said lever and said steering arm.

2. A servo-motor comprising a rotatable fluid pressure motor, a rotatable control coaxial therewith and functioning to cause angular movement of the motor into alignment with the angular position to which the control is moved, an arm extending from the motor and rotatable thereby, connecting means between said arm and the device to be actuated, a second arm extending from the control, a lever pivoted to the first arm and having pivotal connection with the second arm, and operator-controlled means having positive connection with the lever and a lost-motion connection with the connecting means, the point of connection between the operator-controlled means and the lever being such as to cause the second arm to be moved more rapidly than the connecting means.

GEORGE G. MORIN.
EMILE J. CARLETON.